Figure 1:
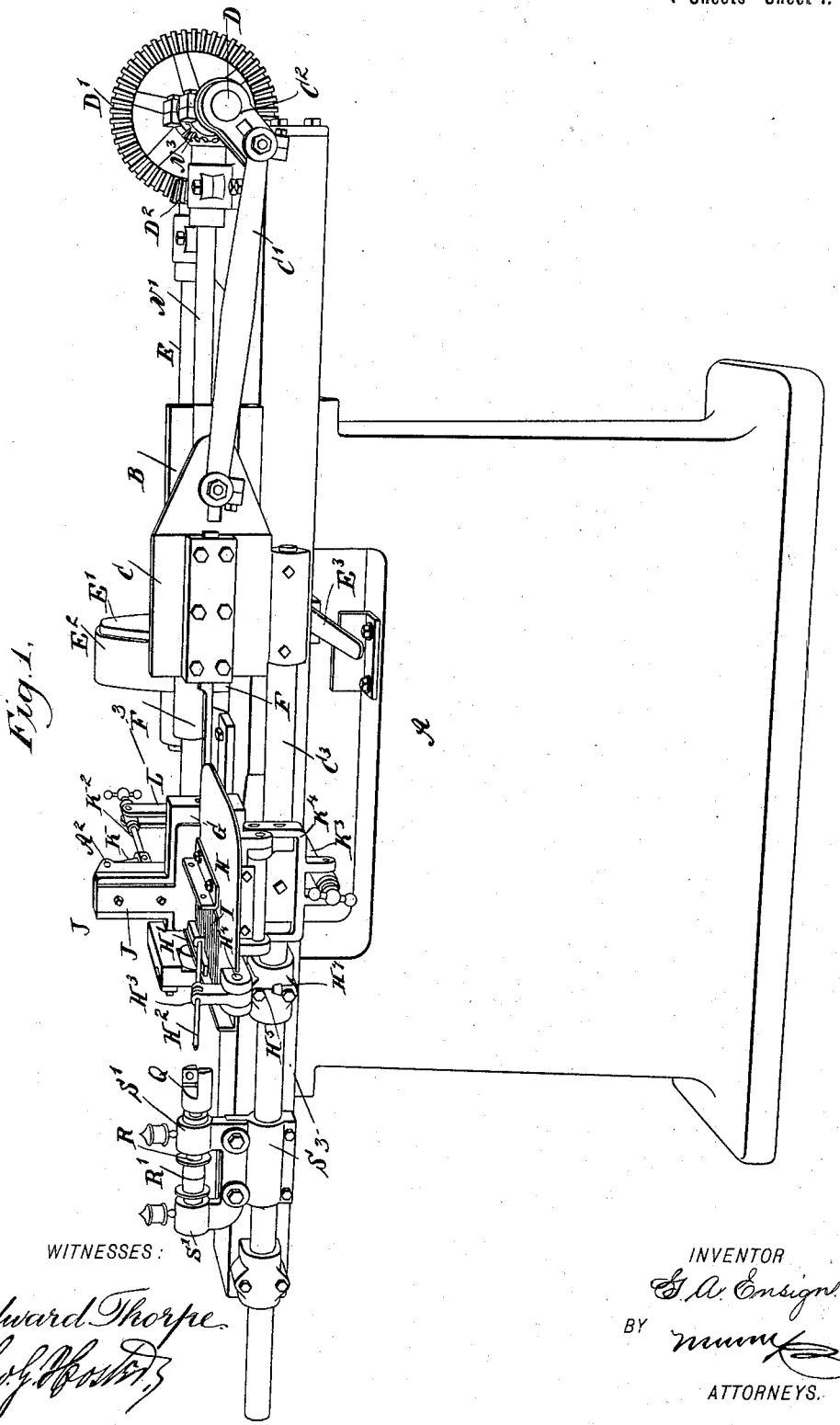

No. 609,336. Patented Aug. 16, 1898.
G. A. ENSIGN.
MACHINE FOR MAKING SKEWERS, PINS, &c.
(Application filed Dec. 7, 1897.)
(No Model.) 4 Sheets—Sheet 1.

WITNESSES:
Edward Thorpe

INVENTOR
G. A. Ensign
BY
ATTORNEYS.

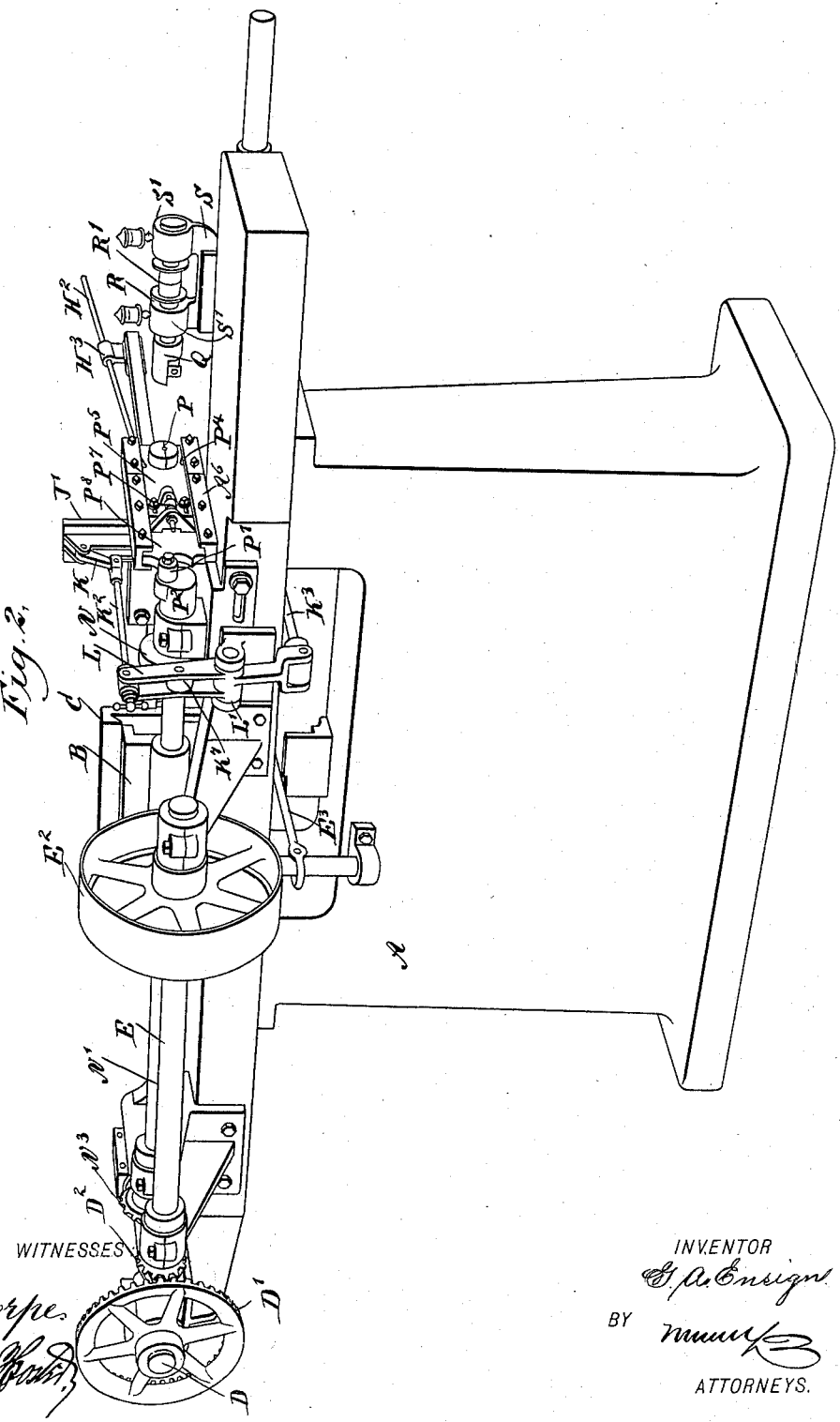

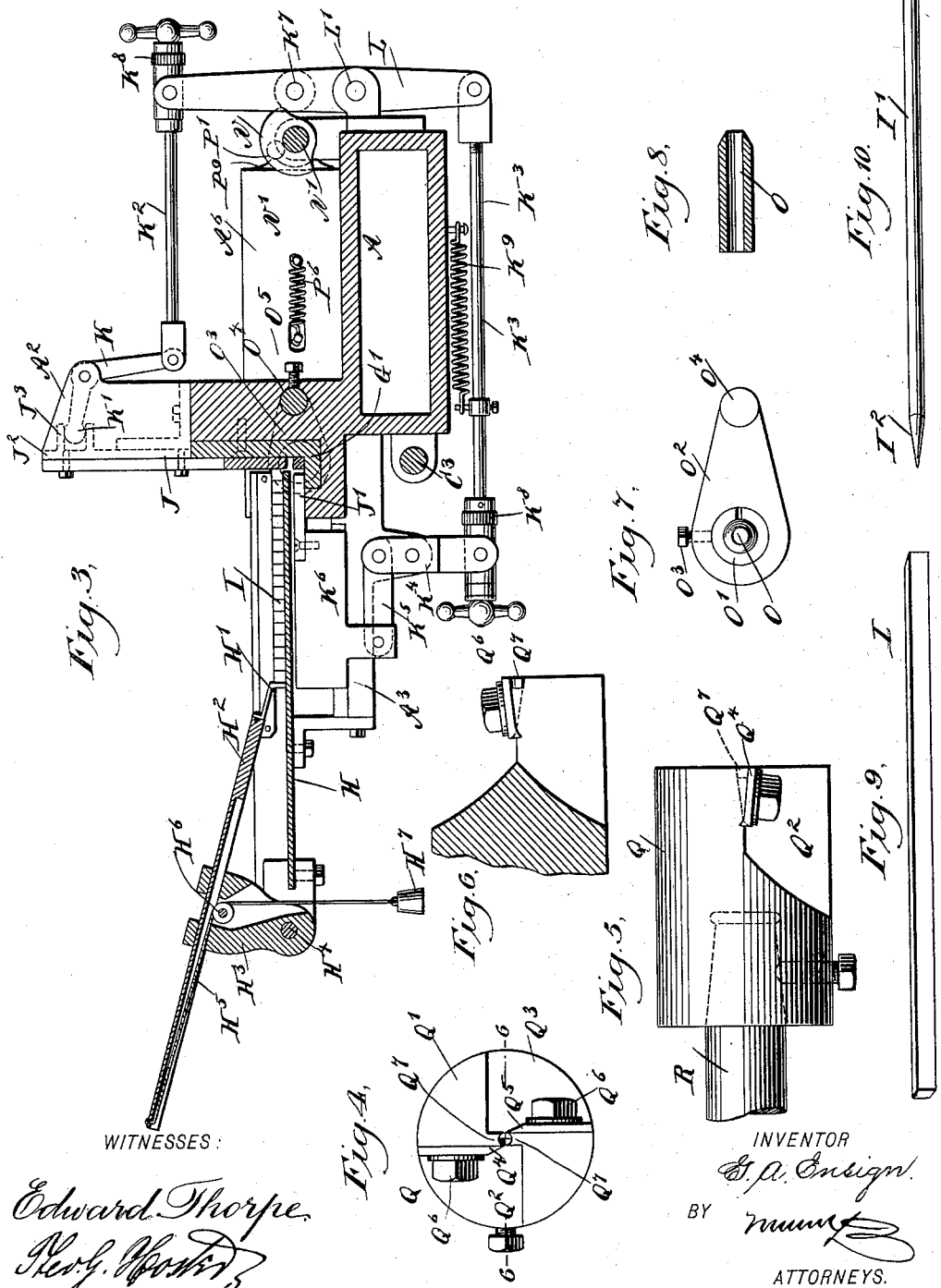

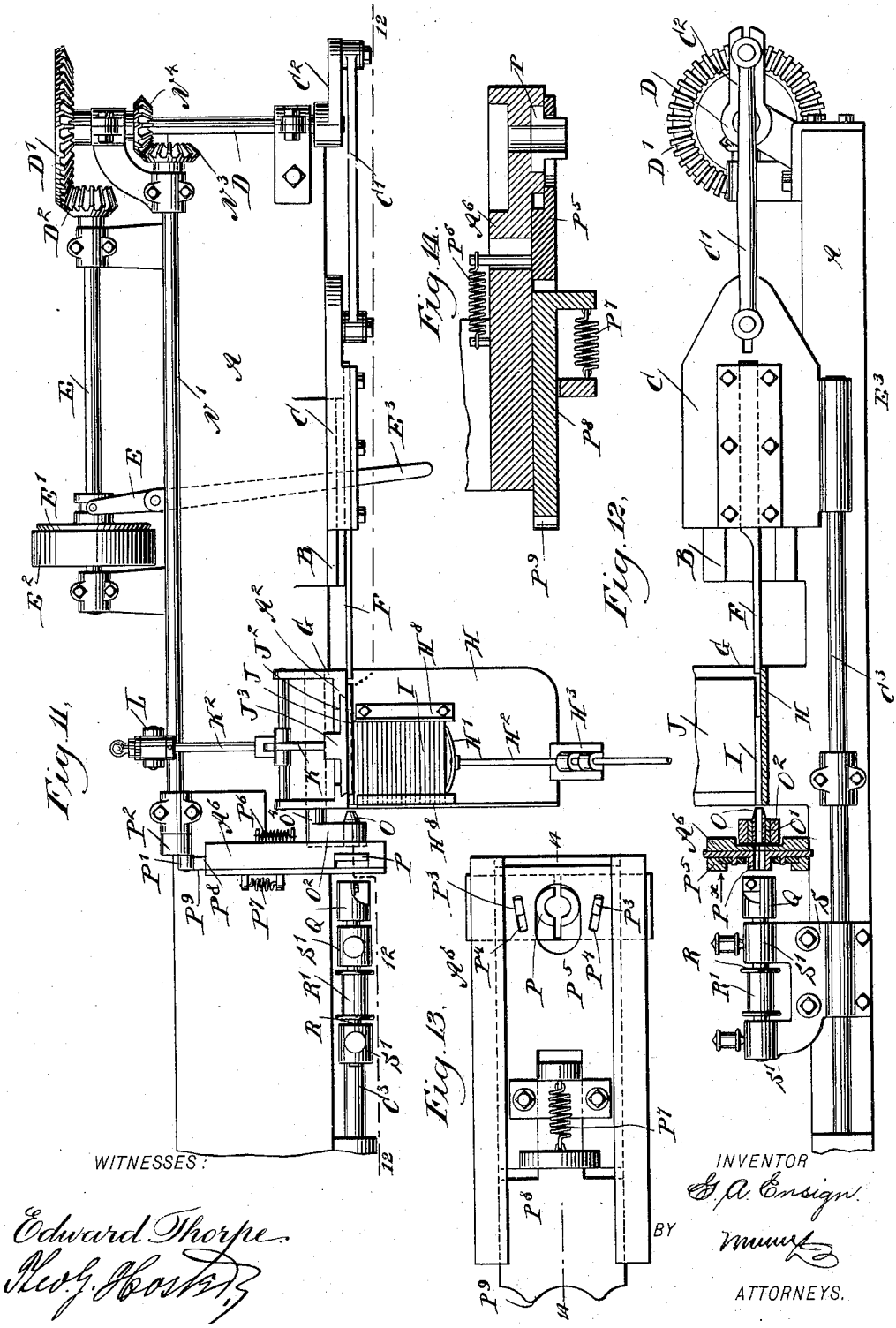

UNITED STATES PATENT OFFICE.

GEORGE A. ENSIGN, OF DEFIANCE, OHIO, ASSIGNOR TO THE DEFIANCE MACHINE WORKS, OF SAME PLACE.

MACHINE FOR MAKING SKEWERS, PINS, &c.

SPECIFICATION forming part of Letters Patent No. 609,336, dated August 16, 1898.

Application filed December 7, 1897. Serial No. 661,058. (No model.)

*To all whom it may concern:*

Be it known that I, GEORGE A. ENSIGN, of Defiance, in the county of Defiance and State of Ohio, have invented a new and Improved Machine for Making Skewers, Pins, &c., of which the following is a full, clear, and exact description.

The invention relates to woodworking machinery; and its object is to provide a new and improved machine for making butchers' and packers' skewers, dowel-pins, and similar articles with great accuracy and in large quantities in a comparatively short time.

The invention consists of novel features and parts and combinations of the same, as hereinafter more fully described, and pointed out in the claims.

Reference is to be had to the accompanying drawings, forming a part of this specification, in which similar characters of reference indicate corresponding parts in all the figures.

Figure 1 is a front perspective view of the improvement. Fig. 2 is a rear perspective view of the same. Fig. 3 is an enlarged transverse section of the improvement on the line 3 3 of Fig. 1. Fig. 4 is an enlarged end elevation of the outer head for pointing the pins. Fig. 5 is a plan view of the same. Fig. 6 is a sectional plan view of the same on the line 6 6 of Fig. 4. Fig. 7 is a face view of the die and its holder. Fig. 8 is a sectional side elevation of the die. Fig. 9 is a perspective view of one of the blanks for forming a pin. Fig. 10 is a perspective view of the finished article. Fig. 11 is a plan view of the improvement. Fig. 12 is a side elevation of the same, with parts in section, substantially on the line 12 12 of Fig. 11. Fig. 13 is an enlarged end elevation of the gripping device for the blank, seen in the direction of the arrow $x$ in Fig. 12; and Fig. 14 is a sectional plan view of the same on the 14 14 of Fig. 13.

The improved machine is mounted on a suitably-constructed frame A, provided with longitudinal guideways B for a cross-head C to reciprocate on, the said head being connected by a pitman C' with a crank-arm $C^2$, secured on a shaft D, extending transversely and journaled in suitable bearings on one end of the frame A. The shaft D is provided at its rear end with a bevel gear-wheel D', in mesh with a bevel-pinion $D^2$, secured on one end of a longitudinally-extending driving-shaft E, journaled in suitable bearings on the rear end of the frame A and carrying a friction-pulley E', adapted to be thrown in frictional contact with a driving-pulley $E^2$, connected by belt with other machinery and held to rotate loosely on the shaft E. The friction-pulley E' is moved in or out of engagement with the driving-pulley $E^2$ by a shipper $E^3$ of any approved construction, the handle of which extends to the front of the machine, so as to be under the convenient control of the operator.

The cross-head C carries a removable plunger F for forcing the blank for a pin through a fixed die, as hereinafter more fully described, the said plunger F being adapted to pass into a guideway G, provided with a shoe G', made L shape for receiving a single blank I at a time from a feed-table H, extending transversely at the front side of the machine, as shown in the drawings. (See Fig. 3.) The blanks I are prepared on other machines to exact lengths and are square in cross-section. A number of the blanks I are placed one behind the other between guideways $H^8$ on the feed-table H and fed transversely into the shoe G' by a presser-foot H' engaging the outermost blank at the outer side thereof to exert a pressure on all the blanks on the feed-table and cause the innermost one to pass against the vertical member of the shoe G' at the time the guide-plates J J' are in an open position, the bottom of the shoe G' being a distance below the table H corresponding approximately to the heights of the blanks I, as will be readily understood by reference to Fig. 3. When the plate J moves downward, it pushes the innermost blank I downward onto the bottom of the shoe, and as the other plate moves transversely at the same time that the plate J moves downward the said blank I is movably held in the shoe G' by the plates J J'.

The presser-foot H' is held on a rod $H^2$, held in an inclined position and fitted to slide in a bearing $H^3$, fulcrumed loosely at $H^4$ on the table H. A string $H^5$ is connected with the upper end of the rod H² and extends along a groove on the under side of the said rod to finally pass over a pulley H⁶, journaled in the bearing H³ under the said rod and within an opening to permit the string H⁵ to hang downward loosely, the said string carrying at its lower end a weight H⁷ for pushing the rod H² transversely, so as to cause the presser-foot H' to feed the dowel-blanks transversely, as previously explained. (See Fig. 3.)

The guide-plates J J' stand at a right angle to each other, with the guide-plate J attached to a slide J², fitted to slide vertically in a suitable guideway A², forming part of the frame, and on the upper end at the back of the said guide-plate are formed lugs J³, engaged by the rounded-off end K' of one of the arms of a bell-crank lever K, fulcrumed at the back of the guideway A². The bell-crank lever K is connected by an adjustable link K² with a lever L, fulcrumed at L' on the back of the frame A and connected by a link K³, similar to the link K², with a lever K⁴, connected by a link K⁵ with a slide K⁶, carrying the guide-plate J' and fitted to slide transversely on a suitable guideway A³, forming part of the frame A.

The lever L is provided with a friction-roller K⁷, adapted to be engaged by a cam N, secured to a longitudinally-extending shaft N', journaled in suitable bearings in the main frame and provided with a bevel gear-wheel N³, in mesh with a similar gear-wheel N⁴, secured on the shaft D, so that when the latter is rotated a rotary motion is given to the shaft N' to cause the cam N to impart an intermittent swinging motion to the lever L to actuate the plates J J' for the introduction of the innermost dowel-blank into the shoe G', as before explained. This operation takes place at the time the cross-head C, with the plunger F, is in an outermost or right-hand position.

Each of the links K² K³ is provided with a rubber block or spring K⁸ to compensate for slight variations in the size of the blanks I, as the said rubber or spring K⁸ will give sufficiently to lengthen or shorten the links K² K³, and consequently the feed of the plates J J', to insure a proper guiding contact of the plates with the blank in the shoe.

A die O, which is cylindrical in shape, with the front end beveled to form a cutting edge, as plainly shown in Fig. 7, is fitted into a split bushing O', held in a carrier O² and secured therein by a set-screw O³, the said carrier being in the shape of an arm projecting from a shaft O⁴, removably held in an opening in the frame A and normally secured therein by a set-screw O⁵, as indicated in Fig. 3. The opening in the die O is in alinement with the longitudinal axis of the blank I, held in the shoe G' at the time, so that when the plunger F moves forward it pushes the blank I into the die O, so as to cut the blank into cylindrical shape. The forward end of the blank passes from the die O partly into a gripping device in the form of a pair of jaws P in alinement with the die O and adapted to be opened and closed by a suitable mechanism actuated by a friction-roller P', held on a crank-arm P², secured to the shaft N', (see Fig. 2,) the said pair of jaws P holding the cylindrical pin in place for a cutter-head Q to operate on the pin to form a point thereon.

The jaws P of the gripping device (see Figs. 13 and 14) are fitted to slide vertically in suitable guideways formed on the transversely-extending bracket A⁶, secured to or forming part of the frame A. On the jaws are formed pins P³, engaged by angular slots P⁴, formed in a slide P⁵, fitted to slide transversely in suitable bearings in the bracket A⁶. A spring P⁶ presses on the slide P⁵ to hold the latter normally in a rearmost position to keep the jaws P open for the entrance and rejection of the blank. The slide P⁵ is also connected by a spring P⁷ with a second slide P⁸, likewise fitted to slide transversely in the bracket A⁶. The rear outer edge P⁹ of this second slide P⁸ is formed with a cam-face adapted to be engaged by the friction-roller P', previously mentioned, to impart a forward sliding motion to the slide P⁸. The latter by the spring P⁷ imparts a graduated forward sliding movement to the other slide P⁵, so that the latter closes the jaws P to securely hold the cylindrical blank in place during the time the cutter Q forms the point on the projecting end of the blank.

The cutter-head Q is mounted to rotate and is secured for this purpose on a spindle R, provided with a pulley R', connected by belt with suitable machinery for rotating the spindle of the cutter-head at a high rate of speed. The spindle R is journaled in bearings S' of a carrier S, attached to a longitudinally-extending rod C³, fitted to slide in suitable bearings on the main frame A and rigidly connected with the cross-head C, so as to reciprocate with the same. Thus when the cross-head C moves outward the plunger F is withdrawn from the shoe G' and the cutter-head Q is moved to the right to engage the cylindrical pin held on the jaws, so as to form a point on the said pin.

The cutter-head Q is provided with a body Q', cut out at opposite sides, as at Q² and Q³, for the knives Q⁴ Q⁵, secured in place by suitable screws Q⁶, as is plainly indicated in Figs. 4 and 5. The cutter edges of the knives Q⁴ Q⁵ extend longitudinally toward each other from the front of the cutter-head to the rear end thereof, so that when the head moves forward and the dowel-pin passes through the semicircular registering openings of the guide-plates Q⁷ then the cutting edges of the cutters Q⁴ Q⁵ trim off the surplus material on the ends of the cylindrical pins or sticks I' to form the point I². (Shown in Fig. 10.)

The plunger F recedes when close to the cutting edge of the die O, with the blank forced into the die and the open jaws and with the forward end of the blank projecting beyond the jaws (which now close) for the cutter-head Q to form the point at this projecting end of the cylindrical blank. When the point has been finished and the cutter-head Q retreats with the next forward movement of the plunger, then the second pin forced by the plunger into the die O pushes the first finished pin out of the die O and jaws P, which are now open.

It is understood that while the plunger F is forcing the blank through the cutting-die O the guide-plates J J' are standing in a stationary position against the blank, owing to the cam N acting on the friction-roller $K^7$. When the plunger commences to retreat, the cam N permits the lever L to swing back by the action of the spring $K^9$ to permit the plates J J' to move into an outermost position. When the plunger F has receded about half its return stroke, then the friction-roller P' moves against the cam-surface $P^9$ to actuate the gripping device to cause the jaws to firmly close upon the blank, and the jaws remain closed until the point is finished by the cutter-head Q, as before explained, and until the said head has begun to retreat on the advance of the plunger for the next pin.

Having thus fully described my invention, I claim as new and desire to secure by Letters Patent—

1. A machine of the class described, provided with a blank-feed comprising a presser-foot, a rod carrying the presser-foot, a pivoted bearing in which the rod is fitted to slide, and a weight-drawn string, connected with the said rod, to feed the latter in said bearing, substantially as shown and described.

2. A machine of the class described, provided with an L-shaped shoe for receiving a blank, a table in front of the said shoe, and reciprocating guide-plates, one of which is under the said table and operates in conjunction with the shoe, and the other is disposed vertically and likewise operates in conjunction with the shoe, to move the blank downward into the shoe from the table, substantially as shown and described.

3. A machine of the class described, provided with an L-shaped shoe for receiving a blank, a table in front of the said shoe, reciprocating guide-plates, one of which is under the said table and operates in conjunction with the shoe, and the other is disposed vertically and likewise operates in conjunction with the shoe, to move the blank downward into the shoe from the table, and means, substantially as described, for imparting a simultaneous motion to the said plates, substantially as shown and described.

4. A machine of the class described, provided with an L-shaped shoe for receiving a blank, a table in front of the said shoe, reciprocating guide-plates, one of which is under the said table and operates in conjunction with the shoe, and the other is disposed vertically and likewise operates in conjunction with the shoe, to move the blank downward into the shoe from the table, and means, substantially as described, for imparting a simultaneous motion to the said plates, said means being provided with compensating-springs for allowing the said plates to yield for slight variations in the size of the blanks, substantially as shown and described.

5. In a woodworking-machine, the combination with a frame, of means for holding and feeding a blank, a slide mounted on the frame, a plunger carried by the slide to movably engage the blanks and force the same from engagement with said means, a die with which the blank engages as it passes from said means, a gripping device engaging the blank as it passes from the die, a cutter located adjacent to the gripping device and serving to point the blank, and a rod connecting the slide with the cutter whereby to cause said elements to move back and forth in unison with each other.

6. The combination with a frame, of a guideway, an L-shaped shoe carried thereby, two guide-plates movable respectively on the members of the shoe, a bell-crank in connection with each guide-plate, means for causing the bell-cranks to swing in unison whereby to operate the guide-plates in unison, and a feed-table mounted adjacent to the guide-plates and feeding the work thereto.

7. The combination with a frame, of a guideway formed thereon, an L-shaped shoe held by the guideway, two guide-plates mounted adjacent to the shoe and working thereon, a feed-table adjacent to the guide-plates, a bell-crank lever connected to each guide-plate, a link attached to each bell-crank lever, a lever to which both links are connected, a rotary shaft, and a cam on the shaft and engaging the lever to rock the same.

8. In a woodworking-machine the combination with a frame, of a guide mounted thereon, guide-plates movable on the guide and serving to center the work, a feed-table adjacent to the guide-plates, means for operating the guide-plates, a plunger adapted to push the work from the guide, and a tool for operating on the work as it is pushed from said shoe.

9. In a woodworking-machine, the combination with a frame, of means for holding the work, two guide-plates acting in unison and mounted on said means to center the work, a feed-table adjacent to the guide-plates, a plunger adapted to push the work from the guide-plates, and a tool acting on the work as it is moved from the guide-plates.

10. In a woodworking-machine, the combination with a frame, of a slide, a crank-shaft mounted on the frame and connected with the slide to drive it, a plunger carried by the slide, a work-holding device from which the plunger pushes the work, a die engaged by the work as it passes from said work-holding device, a grip serving to engage the work as it passes from the die, a cutter adapted to point the work when it is held by the die, a connection between the cutter and the slide to move the cutter back and forth in unison with the slide, gearing driven from the crank-shaft and actuating the gripping device in unison with the movements of the slide and cutter, and work-centering devices coacting with the work-holder and driven from the gearing that drives the gripping device.

GEORGE A. ENSIGN.

Witnesses:
PETER KETTENRING,
GEORGE W. DEATRICH.